Figures 1, 6:
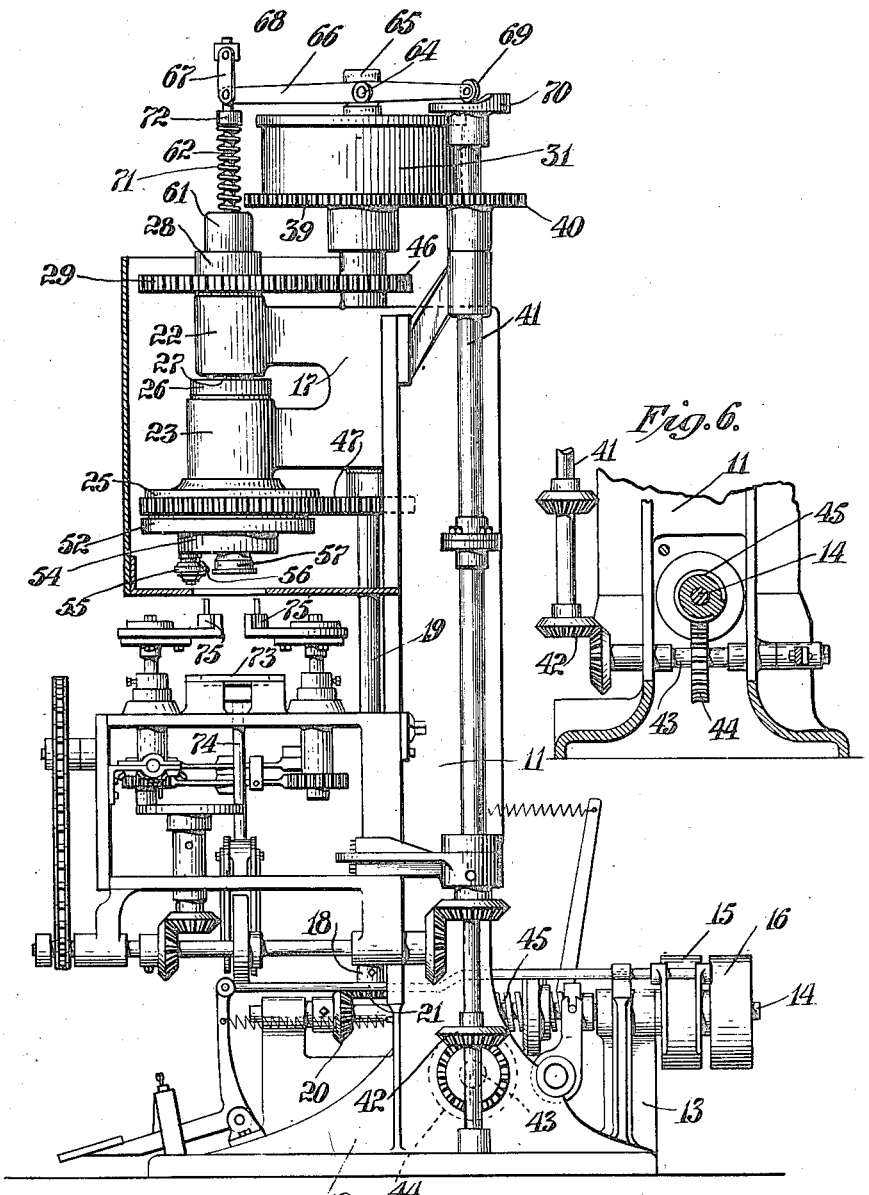

J. BRENZINGER.
CAN HEADING MACHINE.
APPLICATION FILED JULY 5, 1910.

1,167,346.

Patented Jan. 4, 1916.
5 SHEETS—SHEET 1.

Attest:

Inventor:
Julius Brenzinger,
by
Atty

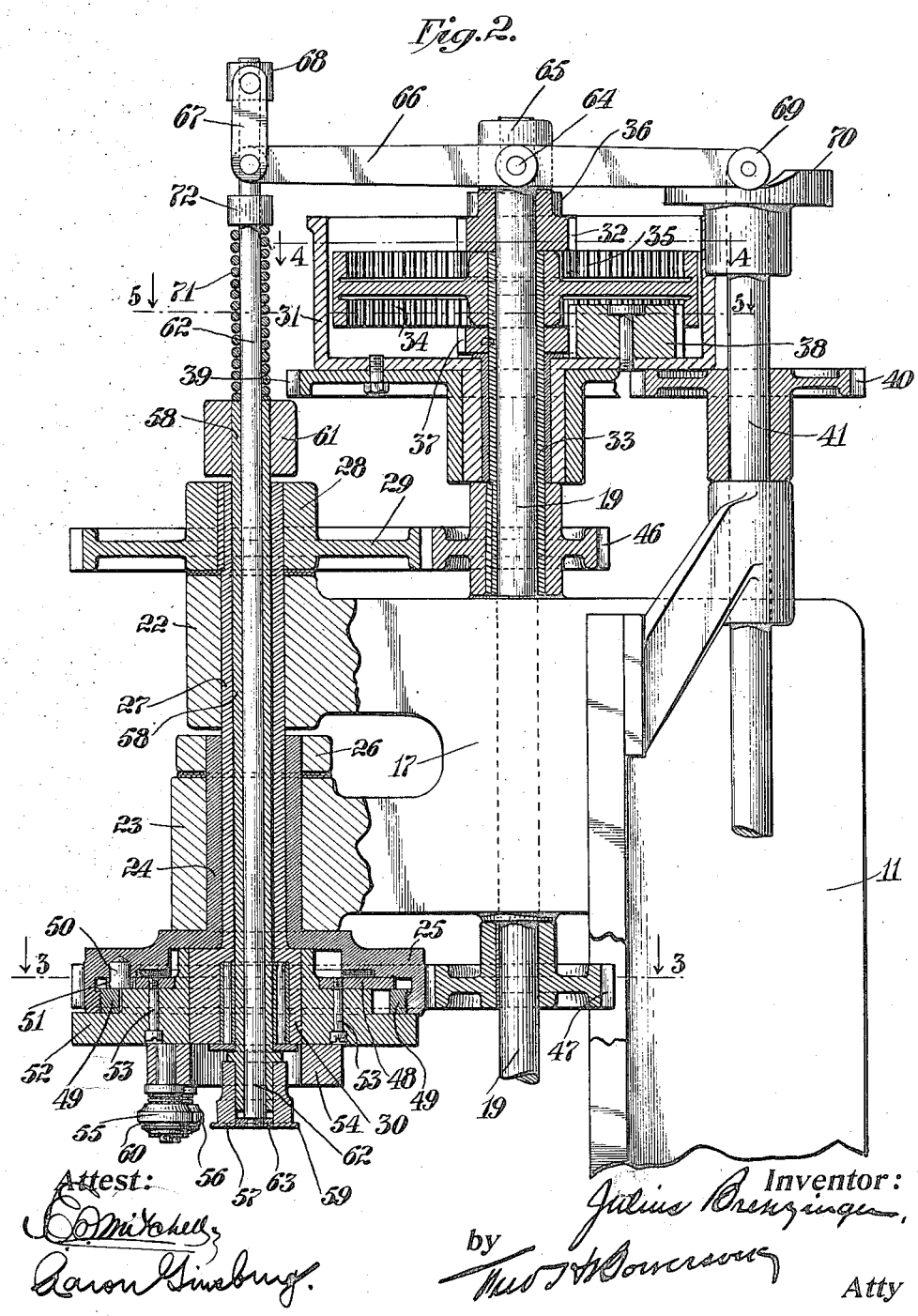

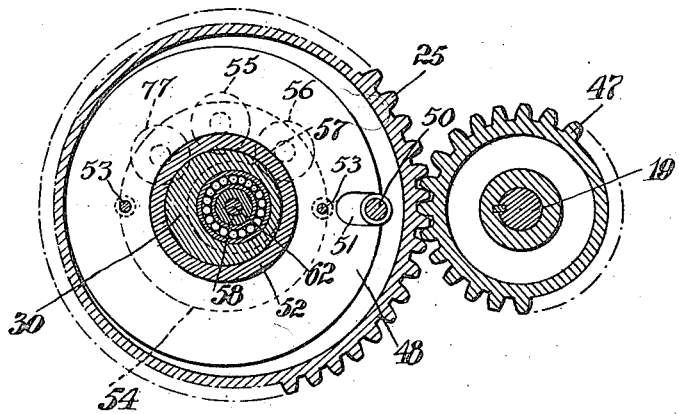
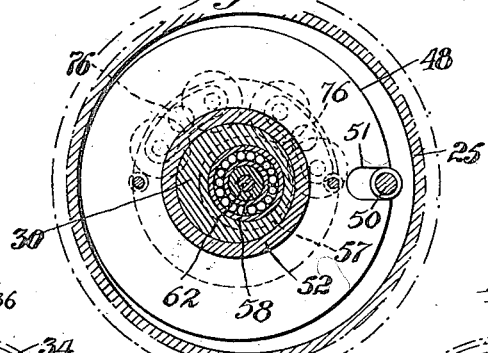
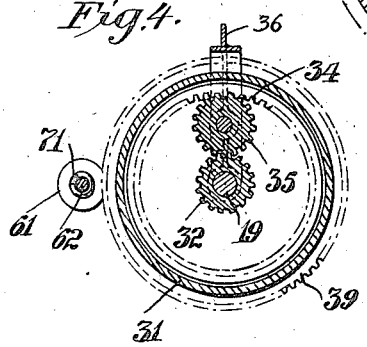
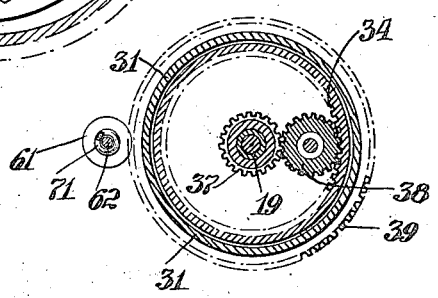

J. BRENZINGER.
CAN HEADING MACHINE.
APPLICATION FILED JULY 5, 1910.

1,167,346.

Patented Jan. 4, 1916.
5 SHEETS—SHEET 4.

WITNESSES
John C Kopf
Fred Gourtner

INVENTOR.
Julius Brenzinger
BY
ATTORNEY.

J. BRENZINGER.
CAN HEADING MACHINE.
APPLICATION FILED JULY 5, 1910.

1,167,346.

Patented Jan. 4, 1916.
5 SHEETS—SHEET 5.

WITNESSES:
John C. Hopf
Fred Pointner

INVENTOR.
BY Julius Brenzinger
Thos H Robinson
ATTORNEY.

UNITED STATES PATENT OFFICE.

JULIUS BRENZINGER, OF MOUNT VERNON, NEW YORK, ASSIGNOR TO THE MAX AMS MACHINE COMPANY, A CORPORATION OF NEW YORK.

CAN-HEADING MACHINE.

1,167,346.

Specification of Letters Patent.

Patented Jan. 4, 1916.

Application filed July 5, 1910. Serial No. 570,343.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification.

This invention relates to machines for securing the tops or bottoms to the body portions of sheet metal containers, commonly known as tin cans, by what is known as the double-seaming process.

The invention more particularly relates to improvements in the general type of machine shown and described in my copending application, filed May 24, 1909, Serial No. 485,451. In this co-pending application, I called attention to certain difficulties encountered when effort was made to provide mechanism for automatically feeding the unseamed cans to the seaming mechanism and ejecting the seamed cans therefrom. The present invention, similarly, has in view a machine in which such difficulties are to a still greater extent overcome, and, in addition to this, I have now in mind a machine which is much simpler in construction and operation than the machine described in the earlier application aforesaid.

Can heading machines, as a rule, are operated at great speed, and where the seaming rollers are revolved about a stationary chuck, the velocity is frequently as high as from eight hundred to one thousand revolutions per minute. It will be apparent that under such conditions the question of lubrication is by no means unimportant, particularly where a number of coöperating parts are necessary to secure movements of certain characters in the members which do the actual work.

A further object of the present invention, therefore, is to reduce so far as possible the number of coöperating parts required to properly adjust and operate the seaming mechanism, in this manner simplifying the problem of lubrication and eliminating the necessity for much lost motion.

My invention will be more readily understood by reference to the accompanying drawings, forming a part of this specification, in which—

Figure 23:
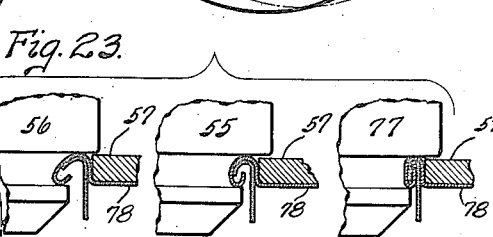

Figure 1 is a side elevation of a machine embodying my invention; Fig. 2 is an enlarged central sectional elevation of the seaming mechanism with the mechanism for driving the same and timing the operations thereof; Fig. 3 is a horizontal section taken substantially on the line 3—3 of Fig. 2; Fig. 4 is a section taken substantially on the line 4—4 of Fig. 2; Fig. 5 is a section taken substantially on the line 5—5 of Fig. 2; Fig. 6 is a sectional detail view, hereinafter described; Fig. 7 is a view similar to Fig. 3 showing a modification of the preferred manner of mounting the seaming rollers; Figs. 8 to 22 are diagrammatic views showing the positions of the seaming rollers with respect to the can parts at the end of each of the fifteen revolutions of said rollers, this number of revolutions having been selected by me, for purposes of illustration and description, as making up the complete cycle during which the double seaming operation is started and completed, and Fig. 23 illustrates diagrammatically the peripheral configuration and action of each of the three seaming rollers.

Referring now to the drawings in detail, numeral 11 refers to a heavy supporting standard upon a suitable base 12. Journaled in the lower part of the standard 11, and the relatively smaller standard 13, is the main driving shaft 14, carrying the usual fast and loose pulleys, 15 and 16, respectively, to which power is transmitted in the usual manner from any suitable source.

From the upper end of the standard 11 projects forwardly the arm or bracket 17, suitably journaled in which and in the smaller arm 18 near the lower end of said standard 11, is the vertical shaft 19, driven from said shaft 14 by means of the intermeshed bevel gears 20 and 21. I have shown the forwardly projecting arm 17 divided to provide the two branches 22 and 23. In the lower branch 23 is journaled the sleeve or cylinder 24, terminating at its lower end in a hollow gear 25. This sleeve 24 is retained in its bearings by means of a collar 26 secured to the upper end thereof. A sleeve or hollow shaft 27 has bearings in the upper branch 22 of the arm 17 and rotates within the sleeve 24. To this sleeve 27 is keyed the hub 28 of the gear 29, and at the lower end of said sleeve is provided the head 30, hereinafter described in detail.

The vertical shaft 19 extends upwardly through the gear box or cylinder casing 31, and carries within said box or casing the pinion 32. At the upper end of said shaft 19 is provided the sleeve or bushing 33, rotatable upon which, within said gear box 31, is the double internal gear 34. Interposed between the pinion 32 and the upper portion of the internal gear 34, is the pinion 35, the axle of which is journaled in the arm 36 secured to the frame of the machine. Keyed to the sleeve or bushing 33, within the gear box or casing 31, is the pinion 37, interposed between which and the lower portion of the internal gear 34, is the pinion 38, having its axle journaled in the bottom plate of the gear box 31. Secured to and rotatable with said gear box 31 is the gear 39, in mesh with the gear 40 on the shaft 41. This shaft 41 is rotated by means of a bevel gear 42 mounted thereon in mesh with the bevel gear 42ª on the short horizontal shaft 43, the shaft 43 being rotated at comparatively slow speed by the gear 44, in mesh with the worm 45 on the main driving shaft 14 (see Fig. 6). It will be apparent that as the shaft 41 is rotated, the gear box 31 will be rotated through the intermeshed gears 39 and 40. Rotation of the shaft 19 will, through the pinion 32 and the pinion 35 interposed between said pinion and the internal gear 34, effect rotation of the latter. Rotation of said internal gear 34, through the interposed pinion 38, will rotate the pinion 37, which is fixed to and rotates the sleeve or bushing 33.

It will be apparent that if the gear box 31 is slowly rotated in the direction of the rotating gear 34, the pinion 38 will be slowly advanced in the same direction and therefore slightly retard rotation of the pinion 37 and the sleeve 33, which would otherwise rotate at the same velocity as the pinion 32 and the shaft 19. It will be seen, therefore, that the pinion 46, keyed to the sleeve 33, will, through the gear 29, rotate the sleeve 27 at a slightly less velocity than the hollow gear 25 is rotated by the pinion 47 keyed on the shaft 19.

The circular head 30 at the lower end of the sleeve 27, which is rotating on the hollow shaft 58, provides a bearing for the annular block 52 which is eccentric to said hollow shaft, this block being retained on its bearing by means of an annular disk-plate 48 secured to said block by screws 53 and held within the hollow gear 25 by means of the gland-nut 49. This disk-plate 48 is of less diameter than the internal diameter of the hollow gear 25, and therefore has a certain freedom of horizontal movement with respect to said gear. This plate is provided with a radially disposed slot 51 into which projects a pin 50 on the lower face of the gear, whereby said plate, and the block 52 secured thereto, will be rotated by rotation of the gear 25.

On the lower face of the block 52 is suitably secured a ring 54 (or, this part may be simply a reduced portion of said block) in which are journaled the axles of a plurality of seaming rollers. Ordinarily, two seaming rollers are sufficient to properly perform the complete seaming operation, but under some circumstances three rollers are preferable, and as the relative movements of parts is somewhat more complicated when three rollers are employed, I have arbitrarily selected this number of rollers for purposes of illustration, but it is to be distinctly understood that the principles underlying the present invention are just as applicable to seaming mechanism in which two rollers only are employed or such mechanism with more than three rollers. Two of these rollers, 55 and 56, are shown in Fig. 2, and the roller 77 (shown in dotted lines in Fig. 3) is similarly mounted on the ring 54. These rollers are of common and well-known peripheral configuration, the "first operation" roller (which may be assumed to be the roller 56) being provided with a comparatively deep groove which receives the flange of the can top or head and bends the same down around the flange of the can body, the groove of the "second operation" roller 55 being more shallow and serving to fold the intercurled metal layers against the side of the can body, and the groove of the "third operation" roller 77 being still shallower and this roller serving to compress the curled and folded layers into a substantially solid bead, known as a "double seam." The peripheral configuration and the action of each of these rollers is shown diagrammatically in Fig. 23.

The chuck 57 is suitably mounted at the lower end of the hollow shaft 58, and its axis, therefore, is also that of the eccentric head 30 and the gear 25. This chuck is of common and well-known construction and configuration, and it coöperates with each seaming roller in turn in the usual manner to support the parts operated upon during the seaming operation. The hollow shaft 58 is vertically reciprocable through a slight distance, the working edge 59 of the chuck being normally slightly below the plane of the groove 60 in each of the seaming rollers—the space between the collar 61 on said shaft and the hub 28 of the gear 29 (Fig. 2) showing the extent to which provision is made for this depression—in order that there may be no contact between, and therefore no wear upon, the chuck and rollers except when the assembled can parts are interposed therebetween during the seaming operation, the interposed can parts themselves raising the chuck to operative position when they are raised by the lower chuck or supporting platform 73.

I have already explained that the sleeve 27 is rotating at a slightly less velocity than the sleeve 24, wherefore the eccentric head 30 is rotated at a slightly less velocity than the hollow gear 25. As these parts rotate in the same direction, and the hollow gear 25 drives the roller-carrying block 52 which is journaled on said eccentric, it will be apparent that during each cycle of a given number of revolutions the orbits of the seaming rollers will contract and expand, whereby said rollers will periodically approach and recede from the chuck 57—although such approach and recession is progressive and not synchronous, as hereinafter explained. I have found from experience that for best results the relative variation in the velocities of rotation of the block 52 and the eccentric 30 should be in the ratio of 15:14. Therefore, the cycle is complete in fifteen revolutions of the seaming rollers, and in order to make clear in just what manner these rollers are moved to bring them progressively into coöperative positive relation to the chuck, I have shown in Figs. 8 to 22 the relative positions of the parts at the end of each revolution of said rollers throughout the fifteen revolutions of the cycle. In these figures, for the purpose of clearness of illustration, I have somewhat exaggerated the degree of eccentricity of the head 30, which has an effect as hereinafter explained.

Figure 8:
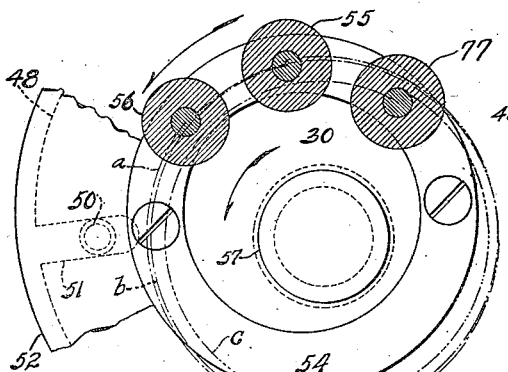

In Fig. 8 the eccentric head 30 and the roller carrying ring 54 are so relatively positioned that the seaming roller 56 is located at a maximum distance from the supported can top 78 and for the purpose of this description this figure is to be considered as illustrating these parts in what may be termed their initial relative positions. As it will require several revolutions of the ring 54 to so advance the same on the eccentric 30 as to bring the first of the seaming rollers, 56, into contact with the edge of the flange of the can top 78, there is sufficient time for the positioning in the seaming mechanism of the assembled parts of the can to be headed.

Figure 9:
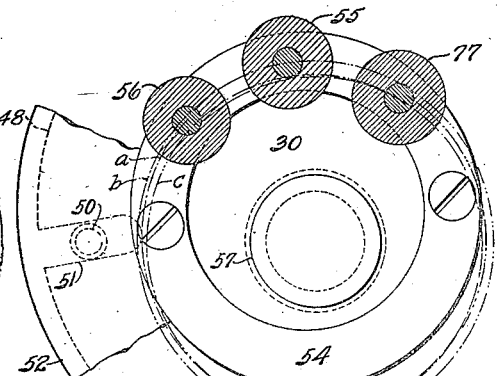
Figure 10:
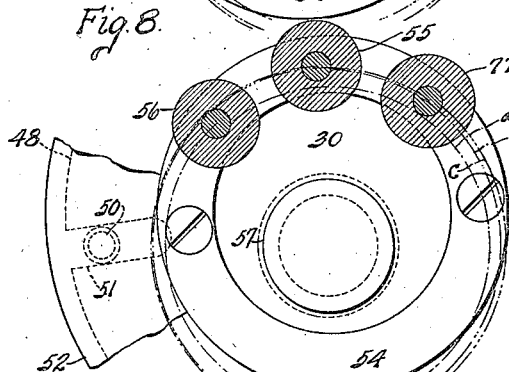
Figure 11:
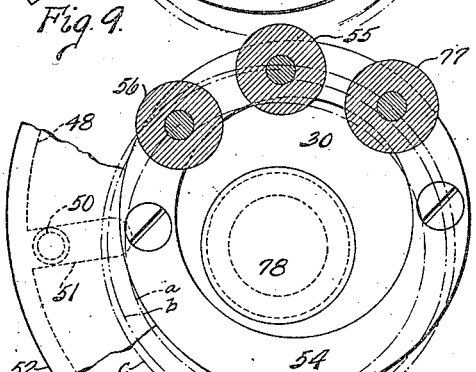
Figure 12:
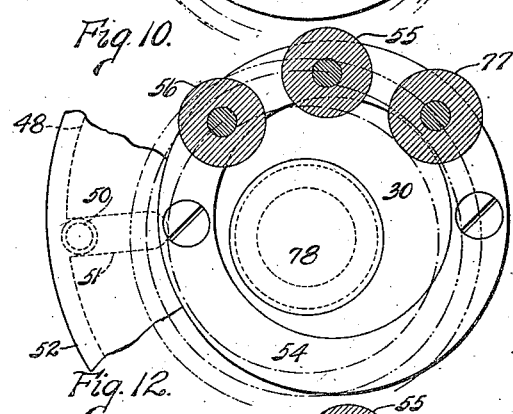
Figure 13:
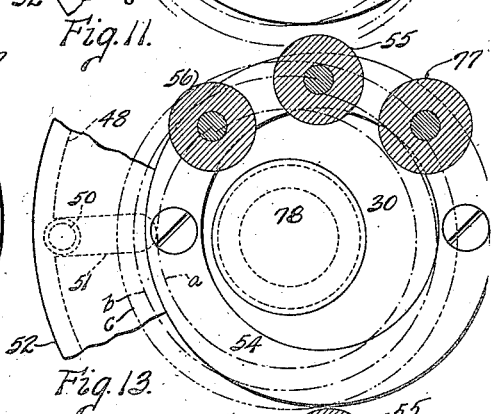
Figure 14:
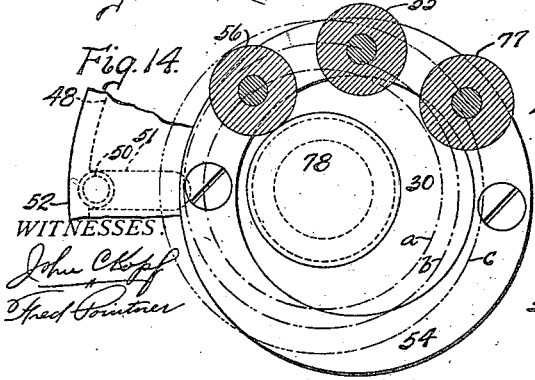
Figure 15:
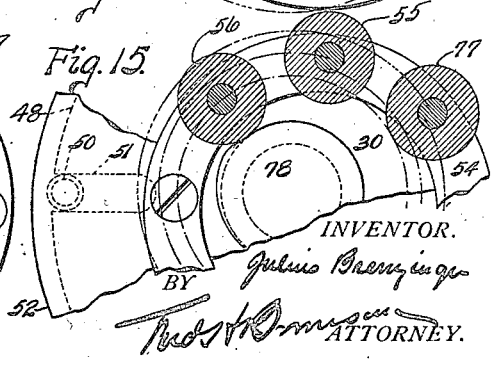
Figure 16:
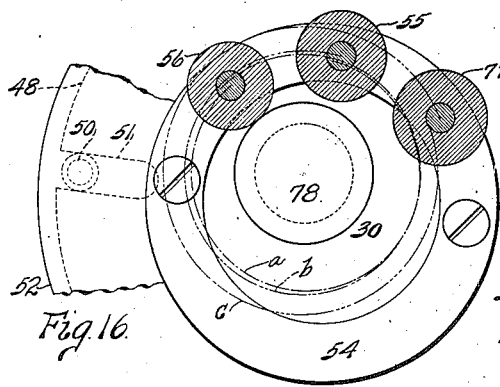
Figure 17:
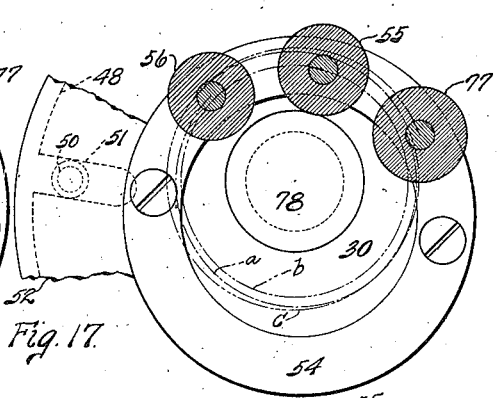
Figure 18:
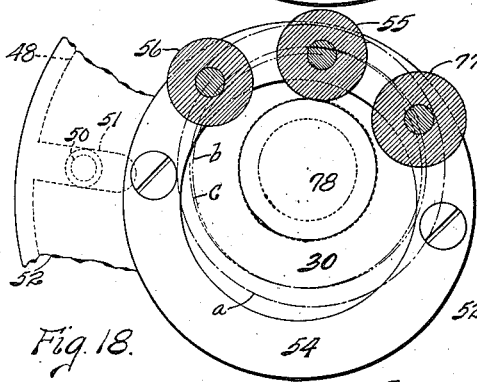
Figure 19:
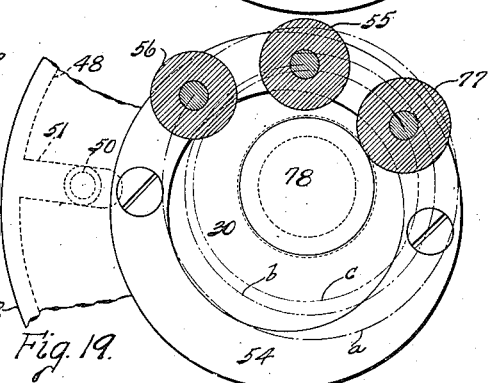
Figure 20:
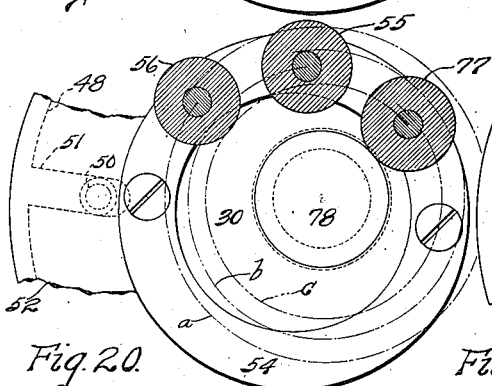
Figure 21:
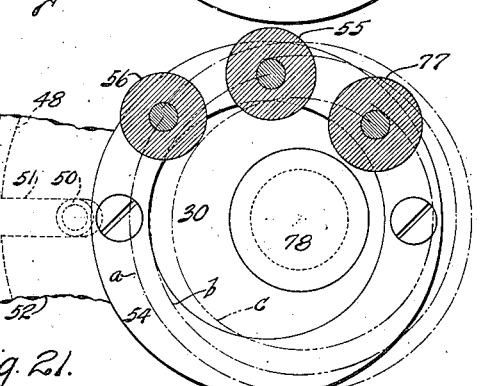
Figure 22:
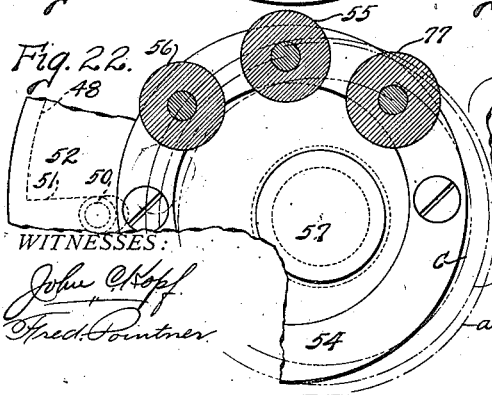

The roller-carrying ring 54 on the block 52 and the eccentric head 30 being both rotated in the direction of the arrow, and the former at slightly greater velocity than the latter, it will be apparent that said block will in one complete revolution gain on the eccentric head by an arc equal to approximately one-fifteenth of the orbit of revolution, or about 24° this change in relative positions of block and eccentric serving to gradually and slightly contract the orbit of the roller 56 and, for the same reason, the orbit of the rollers 55 and 77 will be gradually expanded. The broken spiral line $a$ illustrates the path of movement of the axis of the roller 56, the broken spiral line $b$ the path of movement of the axis of the roller 55, and the broken spiral line $c$ the path of movement of the axis of the roller 77. Therefore, when these rollers have been revolved once around the supported can top 78, the relative positions of the same will be as illustrated in Fig. 9. During the second revolution of these rollers, they will follow the continuations of the broken spiral lines $a$, $b$ and $c$ respectively, which for the same reasons will bring them into the relative positions illustrated in Fig. 10, and by the third revolution thereof they will be brought to the relative positions illustrated in Fig. 11. Figs. 12 and 13 show, respectively, the relative positions of the rollers at the end of the fourth and fifth revolutions thereof, and it will be seen from Fig. 14 that at the end of the sixth revolution, the "first operation" roller 56 has been brought into effectively operative position with respect to the edge of the flange of the can top 78. It will be further noted that during these revolutions, which have resulted in a gradual contraction of the orbit of the roller 56, and caused said roller to gradually approach the edge flange of the can top 78, the orbit of the "second operation" roller 55, which is at first nearly circular, is thereafter gradually contracted in the same manner and to the same degree as was the orbit of the "first operation" roller 56, and the same is true with respect to the orbit of the "third operation" roller 77, the contraction of the orbits being sequential, whereby the action of each roller on the can top is independent of action of the other rollers. It may be stated, however, that from the position shown in Fig. 8, the orbit of the "third operation" roller 77 will be slightly expanded before commencing to contract in the manner described. During the seventh revolution of the "first operation" roller 56, it is preliminarily acting on the flange of the can top 78, as shown in Fig. 15, and the orbit thereof being further gradually contracted during the eighth revolution of said roller, it operates in the common and well-known manner to curl the edge of said flange under the flange of the can body, as shown in Fig. 23, this being the first step of the double seaming operation. During the eighth revolution of the "first operation" roller 56, its orbit has been contracted to a minimum, as shown in Fig. 16, and the first step of the seaming operation is completed, whereupon, under action of the eccentric, the orbit of this roller now starts to expand and said roller, therefore, starts to recede from the intercurled flanges of the can top and body, and during the ninth revolution the orbit of the "second operation" roller 55 has been contracted to a degree to bring said roller into preliminary coöperative positional relation to said intercurled flanges for the intermediate step of the seaming operation—although this may be the final step in case the machine is designed to complete the seaming operation through the employment of two rollers only—relative positions of the rollers and can body at the end of the ninth revolution being illustrated in Fig. 17. The tenth revolution of said rollers completes the effective operation of the "second operation" roller 55, which now, following the "first operation" roller 56, commences to recede from the can top, while the "third operation" roller 77 is being brought into effective action, as shown in Fig. 18. During the eleventh revolution, the "third operation" or compression roller 77 is acting to complete the seam (see Fig. 19) and after the twelfth operation its work has been done, this roller now starting to recede from the headed can, as shown in Fig. 20. At the end of the fifteenth revolution the cycle has been completed and the rollers have been returned to the relative positions shown in Fig. 8. During the thirteenth and fourteenth revolutions of said rollers, all of them are again revolving around the chuck in non-effective positions, as they are during the first, second, third, fourth and fifth revolutions thereof, whereby ample time is provided for the removal of a headed can and the adjustment in the seaming mechanism of the next succeeding can to be headed.

I have now shown how a plurality of seaming rollers, all located in close proximity to each other on the same side of the chuck around which they revolve, may be made to successively approach the assembled can parts supported by said chuck, each in turn do its work and then recede from said chuck. There is, however, another feature which may well be taken into consideration. During each revolution of an effectively operating roller the diameter of the can top is being gradually reduced, owing to the fact that the axis of the roller describes a contracting spiral, and if the degree of contraction at the end of one revolution exceeds a certain limit, the distortion of the flange of the can top at the end of said revolution will differ to such a marked extent from the distortion of said flange at the now beginning next succeeding revolution that said flange will be bent or curled unevenly to the possible extent of preventing the formation of a perfect seam. Therefore, the contraction of the orbit of revolution of each roller during the period of effective operation should be very slight—in fact, the orbit of the last effective revolution of said roller should be nearly circular. On the other hand, in view of the distance from the chuck to which all of said rollers must be removed in order to provide ample clear space for the removal of the headed can and the adjustment in the seaming mechanism of the assembled parts of the next succeeding can to be headed, it will be clear that if the degree of contraction and expansion of the orbits of revolution of said rollers is continuously the same as the degree of contraction thereof during the actual seaming operation, many more than fifteen revolutions of the rollers will be required to remove them far enough away from the chuck to provide the clearance to which I have referred, resulting in a loss of time and a consequent material reduction in the capacity of the machine. It is desirable, therefore, first, that the rollers be located in the closest possible proximity to each other, whereby the action of each after the first will follow in rapid succession and the entire double-seaming operation be completed in the fewest possible number of revolutions of the cycle, and, second, that immediately after the "last operation" roller has completed its action on the can parts, all of said rollers be conveyed as rapidly as possible to their most remote positions with relation to the chuck, where they revolve in a nearly circular and substantially common orbit, and be thereafter just as rapidly returned to their respective positions of effective operation. Now, if the rollers are positioned in close proximity to each other and the degree of eccentricity of the head 30 is comparatively small—and the less the degree of such eccentricity the less lost motion and consequent loss of time and energy—it is evident that in order to secure independent action of each roller in turn throughout a sufficient number of revolutions, an element is required other than the mere revolution of the rollers in contracting spiral orbits, for with a pure reciprocatory movement in a radial direction one roller would follow another in so short an interval of time as to be brought into contact with the work before the roller which it follows had completed its effective operation and been withdrawn. Furthermore, it is desirable that each roller approach the work tangentially and not radially to further safeguard against too abrupt initial action, and recede from the work as nearly perpendicularly as possible to remove the same as rapidly after the performance of its function.

It has been explained that the pin 50 in the lower face of the hollow gear 25 projects into the radial slot 51 in the disk-plate 48 which is secured to the block 52, and serves to rotate said block 52 on the eccentric head 30 at the same velocity as that of said gear 25. Of course, so far as the mere driving of the block 52 is concerned, the relative circumferential location of the slot 51 in the plate 48 is obviously immaterial. However, in insuring independent action of each of a plurality of closely associated rollers, where the degree of eccentricity of the head 30 is comparatively slight an effort is being made to reduce to a minimum both the number of revolutions making up the complete cycle and the number of revolutions required to start and complete the actual double-seaming operations, and in causing each roller to approach the work tangentially instead of perpendicularly or radially, the position of the slot 51 relative to the positions of the rollers is of the greatest importance. For instance, with three rollers positioned with reference to the pin 50, as shown in Fig. 3, with the axis of the middle or intermediate roller 55 in substantially the same vertical plane as the line of the slot 51 into which said pin projects, and considering that the eccentric head 30 is rotating while the block 52 is held against rotation by the pin in said slot—which so far as relative positions at any given instant are concerned is of the same effect as rotating the block and the head at different velocities—the roller 55 would have a substantially rectilinear movement in a radial direction to and from the work. The rollers 56 and 77, however, in addition to a reciprocatory movement in the general direction of the line of the slot, would also have an oscillatory movement about the pin 50 as a pivot, and this oscillatory movement, as the "first operation" roller 56 is reciprocated in the general direction of the work, is also serving the same purpose. Therefore, the velocity of movement of this roller in approaching the work is increased and the roller more rapidly swung to inoperative position after it has acted upon the can top. The same is true with respect to the "third operation" roller 77, the movement of which is the resultant of its combined reciprocation and transverse oscillation. It will thus be clear that with three rollers positioned with relation to the pin 50 as shown in Figs. 2 and 3, each roller in turn will be rapidly brought to operative position, perform its function with a more gradual change of position with relation to the contracting circumference of the can top, and be again rapidly withdrawn to its most remote position. However, while the rollers 56 and 77, positioned with respect to the pin 50 as shown in Fig. 3, would each be brought into actual contact with the work in a more nearly tangential direction, the roller 55 would be brought into effectively operative position in a substantially radial direction. While a machine so constructed would undoubtedly be operative, and result in the formation of a satisfactory seam, I have found that the best results are attained by locating the axis of the middle roller 55 about 90° from the line of the slot 51, as shown in Figs. 8 to 22. This arrangement insures a movement of each roller which is the resultant of combined reciprocation and oscillation thereof, and as will be clearly seen from an inspection of these figures of the drawings, not only will each of these rollers in turn be swung in the direction of the work at increased velocity, perform its function at the essential reduced velocity and be swung to inoperative position at an again increased velocity, but each of said rollers will come into contact with the can top substantially tangentially and in a manner which I have found best for all purposes by practical experiments.

I have hereinbefore referred to the fact that in Figs. 8 to 22, for the purpose of clearness of illustration, I have exaggerated the degree of eccentricity of the head 30. On this account, it would seem from these figures of the drawings that each of the three rollers operated effectively during about two revolutions thereof only, whereas I have stated that as a rule from three to five revolutions of each roller are necessary to form a perfect seam. This is more particularly true, however, when two rollers only are employed, a maximum of three revolutions being sufficient for each of three rollers, and it is submitted that if Figs. 8 to 22 of the drawings were drawn to scale, properly illustrating the desired degree of eccentricity of the head 30, they would also show that each of the three rollers operated effectively for about three revolutions thereof.

As is well known, the chuck 57 fits down into a corresponding depression in the head of the can, and it not infrequently happens that the pressures of the seaming operation cause the chuck to become more or less firmly wedged in the head of the can. To insure ejectment of the can after the heading operation, I provide the rod 62, within the sleeve 58, said rod being provided with a pusher-head 63 fitting in a suitable seat or socket in the lower face of the chuck 57. Pivoted at 64 to the cap 65 in which the upper end of the shaft 19 has bearings, is the lever 66, pivotally connected to said rod 62 through the links 67 and the fixed collar 68, and provided at its other end with the roller 69 which is subject to the action of the cam 70 at the upper end of the shaft 41. It will be apparent that as the shaft 41 is rotated, the cam 70 will operate, through the lever 66, to periodically reciprocate the rod 62, this operation being timed so that immediately following the seaming operation the head 63 will force the seamed can from the chuck 57. The pusher-head 63 is returned to its seat by the spring 71 in compression between the end of the sleeve 58 and the collar 72 on the rod 62.

The unseamed can to be headed, with the parts properly assembled, is placed upon the non-rotatable and vertically reciprocable platform 73 at the upper end of the plunger-rod 74. The mechanism for raising and lowering the platform is fully shown and described in detail in my co-pending application aforesaid and that description need not be repeated here. At the proper time, the platform 73 is raised, with the unseamed can parts thereon, the can-head engaging the chuck—which, as has been explained, is normally below the plane of effective coöperation with the seaming rollers—and raising said chuck to proper position for the seaming operation. During this operation, the "lag" of the eccentric head 30 with respect to the rotation of the block 52 is, in the manner described, bringing the seaming rollers progressively into coöperative positional relation to the working edge of said chuck and the seaming operation thus performed, whereupon the rollers are again carried to inoperative positions and the rod 62 is operated to eject the seamed can and the latter lowered with the platform 73 to be removed and replaced with another unseamed can. I have also shown reciprocating carriers 75 designed to automatically deliver unseamed can-bodies to the platform 73 and convey the seamed cans therefrom, which, together with other parts and mechanisms herein shown but not described in detail, are fully described in my copending application aforesaid.

In Fig. 7 I have illustrated a modification in the manner of mounting the seaming rollers in the block 52. In the preferred construction, just described, I employ a plurality of independent rollers, each having its own fixed axis with reference to the rotating block upon which it is mounted. In the modification shown in Fig. 7, I mount four rollers in pairs, the axles of each pair having bearings in the ends of link 76 which are pivoted to the block 52. The advantage of this construction is that it insures what may be termed a yielding pressure of each roller without loss of efficiency, this yielding character of the forces applied not infrequently saving the machine when a can or its top becomes distorted during the seaming operation, or an obstruction is interposed between chuck and rollers.

With respect to the machine just described, it will be apparent that I have materially simplified the construction shown and described in my earlier patent, hereinbefore referred to, primarily through a construction in which I have done away with many coöperating parts to secure proper positional relationship between the chuck and the seaming rollers and automatically control the movement of these elements with relation to each other. Furthermore, it will be apparent that I have materially simplified the problem of lubrication, there being fewer bearings and other friction surfaces. This problem has been particularly difficult with respect to the rapidly revolving support for the seaming rollers, and in the present construction it will be noted that the manner of mounting the block 52 within the hollow gear 25 provides an annular chamber between the plate or disk 48 and the gear 25, and another between the block 52 and the plate 48, which may be substantially filled with fluid which will reach all of the bearings.

Double seamers of this character are of two general types, one in which the chuck and platform are rotatable and the seaming rollers are successively brought into coöperative positional relation to the rotating chuck, and the other in which the chuck and platform hold the can parts stationary and the seaming rollers revolve around the chuck to effect the seaming operation. The first-mentioned type is doubtless capable of a more perfect degree of adjustment, but is objectionable in view of the fact that the final seaming operation is often effected when the cans are filled with food stuffs or the like which have been heated to a high temperature for purposes of sterilization and preservation. When these cans are rapidly rotated between the rotating chuck and platform, small particles of the heated contents of the can are invariably thrown off by centrifugal force during the seaming operation, with inconvenience—not to say oftimes serious results— to the operator of the machine. The second-mentioned type of machine, therefore, would be considerably far preferable were it not for the fact that difficulty has been experienced in providing mechanism for revolving seaming rollers about a stationary chuck and automatically control movement at proper times of the former into and out of coöperative positional relation to the latter, at the same time insuring the requisite degree of adjustment to effectually seal the can.

With respect to the present invention, it will be clear that the manner in which I mount the block 52 upon the eccentric head 30 insures the automatic movement of the seaming rollers progressively into and out of coöperative positional relation to the chuck—a construction which is subject to as high a degree of accurate adjustment as would be possible in the construction of mechanism for merely bringing each seaming roller in turn into contact with the working edge of a rotating chuck.

Many modifications of minor detail of my improved can heading machine will doubtless readily suggest themselves to those skilled in the art to which it appertains, and I therefore do not desire to limit my invention to the specific construction herein shown and described.

I claim as new and desire to secure by Letters Patent:

1. In a machine of the character described, the combination of a tool-carrier, a movable bearing therefor, means for actuating said carrier relative to its bearing, said carrier having limited freedom of bodily movement in its entirety relative to its actuating means, and means for imparting bodily movement to said bearing to regularly vary the path of movement of said carrier under influence of said actuating means.

2. In a machine of the character described, the combination of a tool-carrier, a movable bearing therefor, means for actuating said carrier relative to its bearing, said carrier having limited freedom of bodily movement in its entirety with relation to said actuating means, and means for moving said bearing in a fixed path to regularly vary the path of movement of said carrier to render operation of a tool thereon intermittently effective.

3. In a machine of the character described, the combination of a member carrying a plurality of tools, a movable bearing therefor, means for actuating said member relative to its bearing, said member having limited freedom of bodily movement in its entirety with relation to said actuating means, and means for moving said bearing to regularly vary the path of movement of said member to render operations of said tools intermittently and successively effective.

4. In a can heading machine, the combination, with means for supporting the assembled parts of the can to be headed, of a rotatable member having a seaming tool mounted thereon, means for rotatively supporting and means for rotating said member, each of said last-mentioned means permitting movement of said member relative thereto and combining to cause and control such movement to regularly vary the position of said tool relative to said can parts.

5. In a can heading machine, the combination, with means for supporting the assembled parts of the can to be headed, of a rotatable member having a plurality of seaming tools mounted thereon, means for rotatively supporting and means for rotating said member, each of said last-mentioned means permitting movement of said member relative thereto and combining to cause and control such movement to vary intermittently and in regular succession the positions of said tools relative to said can parts.

6. In a can heading machine, the combination with means for supporting the assembled parts of a can to be headed, of a member journaled on a traveling bearing, a seaming roller mounted on said member, means for rotating said member, and means for actuating said bearing to regularly vary the position of the member thereon relative to said supporting means, said rotating means permitting of relative bodily movement of said member in its entirety with its bearing.

7. In a can heading machine, the combination, with means for supporting the assembled parts of a can to be headed, of a member journaled on a traveling bearing, a plurality of seaming rollers mounted on said member, means for rotating said member, and means for actuating said bearing to regularly vary the position of the member thereon relative to said supporting means, said rotating means permitting of relative bodily movement of said member in its entirety with its bearing to vary in regular succession the positions of said rollers relative to the supported can parts.

8. In a can heading machine, the combination, with means for supporting the assembled parts of the can to be headed, of a rotating member, a plurality of seaming rollers having bearings in said member, all located on one side of the axis of rotation of said member and being revolved thereby around the parts to be seamed, and means for automatically varying the position of said member relative to said supporting means to bring said rollers into successively effective relation to said can parts.

9. In a can heading machine, the combination, with means for supporting the assembled parts of the can to be headed, of a rotating member, a plurality of seaming rollers having bearings in said member, all located on one side of the axis of rotation of said member and being revolved thereby around the parts to be seamed, and means for automatically varying the position of said member relative to said supporting means to bring said rollers successively into operatively effective relation to the supported can parts and each at a variable speed.

10. In a can heading machine, the combination, with means for supporting the assembled parts of the can to be headed, of a rotating member, a plurality of seaming rollers having bearings in said member, all located on one side of the axis of rotation of said member and being revolved thereby around the parts to be seamed, and means for automatically varying the position of said member relative to said supporting means to bring said rollers successively into operatively effective relation to the supported can parts at a gradually decreasing speed and withdraw the same at a gradually increasing speed.

11. In a can heading machine, the combination, with means for suitably supporting the assembled parts of the can to be headed, of a rotating bearing block eccentrically disposed with reference to said can supporting means, a member mounted to rotate on said bearing block, a seaming roller carried by said member, and means for rotating said member and said block at uniformly different velocities.

12. In a can heading machine, the combination, with means for suitably supporting the assembled parts of the can to be headed, of a rotating bearing block eccentrically disposed with reference to said can supporting means, a member mounted to rotate on said block, a plurality of seaming rollers carried by said member, and means for rotating said member and said block at uniformly different velocities.

13. In a can heading machine, the combination, with means for suitably supporting the assembled parts of the can to be headed, of a rotating bearing block eccentrically disposed with reference to said can supporting means, a member mounted to rotate on said block, a plurality of seaming rollers carried by said member and all located on one side of the axis of rotation of said member, and means for rotating said member and said block at uniformly different velocities.

14. In a can heading machine, the combination, with means for suitably supporting the assembled parts of the can to be headed, of a rotating bearing block eccentrically disposed with reference to said can supporting means, a member mounted to rotate on said block, a seaming roller having fixed bearings in said member and being revolved thereby around the parts to be seamed, and means for rotating said block and said member in the same direction at different velocities.

15. In a can heading machine, the combination, with means for suitably supporting the assembled parts of the can to be headed, of a rotating bearing block eccentrically disposed with reference to said can supporting means, a member mounted to rotate on said block, a plurality of seaming rollers each having fixed bearings in said member and being revolved thereby around the parts to be seamed, and means for rotating said block and said member in the same direction at different velocities.

16. In a can heading machine, the combination, with means for suitably supporting the assembled parts of the can to be headed, of a rotating bearing block eccentrically disposed with reference to said can supporting means, a member mounted to rotate on said block, a plurality of seaming rollers having fixed bearings in said member, all located on one side of the axis of rotation of said member and being revolved thereby around the parts to be seamed, and means for rotating said block and said member in the same direction at different velocities.

17. In a can heading machine, the combination, with means for supporting the assembled parts of the can to be headed, which means include a can-top-supporting chuck, of a rotating bearing block eccentrically mounted with reference to said chuck, a member mounted to rotate on said block, a seaming roller having fixed bearings in said member and being thereby revolved around said chuck, and means having common actuating means for rotating said bearing block and said member in the same direction at different velocities.

18. In a can heading machine, the combination, with means for supporting the assembled parts of the can to be headed, which means include a can-top-supporting chuck, of a rotating bearing block eccentrically mounted with reference to said chuck, a member mounted to rotate on said block, a plurality of seaming rollers each having fixed bearings in said member and being thereby revolved around said chuck, and means having common actuating means for rotating said bearing block and said member in the same direction at different velocities.

19. In a machine of the character described, the combination of a circular eccentric, a tool carrier journaled thereon, a member concentrically journaled on bearings having the same axis as that of the eccentric, connecting means between said member and said carrier to hold them against relative rotary movement, and means for establishing relative rotary movement between said eccentric and said member.

20. In a machine of the character described, the combination of a rotating circular eccentric, a tool carrier journaled on said eccentric, a member rotating concentrically about the axis of the eccentric, and connecting means between said member and said carrier to rotate the latter on and independently of said eccentric.

21. In a machine of the character described, the combination of a rotating circular eccentric, a tool carrier journaled on said eccentric, a member rotating concentrically about the axis of the eccentric, and connecting means between said member and said carrier to rotate the latter on said eccentric at a different velocity.

22. In a machine of the character described, the combination of a rotating circular eccentric, a tool carrier journaled on said eccentric, a member rotating concentrically about the axis of the eccentric, and means for rotating said carrier from said member, said means comprising a pin in one of said elements projecting into a slot in the other element.

23. In a machine of the character described, the combination of a rotating circular eccentric, a tool carrier journaled on said eccentric, a plurality of tools all mounted on one side of the axis of said carrier, a member rotating concentrically about the axis of the eccentric, and connecting means between said member and said carrier to rotate the latter on and independently of said eccentric.

24. In a machine of the character described, the combination of a rotating circular eccentric, a tool carrier journaled on said eccentric, a plurality of tools all mounted on one side of the axis of said carrier, a member rotating concentrically about the axis of the eccentric, and means for rotating said carrier from said member, said means comprising a pin in one of said elements projecting into a slot in the other element.

25. In a machine of the character described, the combination, of a can-top supporting chuck, a vertical shaft carrying said chuck, a sleeve on said shaft terminating at its lower end in a circular eccentric head, a gear on said sleeve, another sleeve on said first-mentioned sleeve terminating at its lower end in a gear, an annular block journaled on said eccentric head and supported and rotated thereon by said last-mentioned gear, a plurality of seaming rollers mounted on said block, and means for rotating said gears at different velocities.

26. In a machine of the character described, the combination, of a can-top supporting chuck, a vertical shaft carrying said chuck, a sleeve on said shaft terminating at its lower end in a circular eccentric head, a gear on said sleeve, another sleeve on said first-mentioned sleeve terminating at its lower end in a gear, an annular block journaled on said eccentric head and supported and rotated thereon by said last-mentioned gear, a plurality of seaming rollers mounted in substantially close proximity to each other on the same side of said block, and means for rotating said gears at different velocities.

27. In a machine of the character described, the combination, with a concentric and an eccentric member rotating at different velocities about the same axis, of a tool carrier journaled on said eccentric member, and connecting means between said concentric member and said carrier to rotate the latter and permit of relative lateral movements thereof.

28. In a machine of the character described, the combination, with a concentric and an eccentric member rotating at different velocities about the same axis, of a tool carrier journaled on said eccentric member, and connecting means between said concentric member and said carrier to rotate the latter and permit of a combined reciprocatory and oscillatory movement thereof with relation to the former.

29. In a machine of the character described, the combination, with a concentric and an eccentric member rotating at different velocities about the same axis, of a tool carrier journaled on said eccentric member, and connecting means between said concentric member and said carrier to rotate the latter and permit of a reciprocatory movement thereof in one direction and a simultaneous oscillatory movement in a transverse direction with relation to the former.

30. In a machine of the character described, the combination, with a concentric and an eccentric member rotating at different velocities about the same axis, of a tool carrier journaled on said eccentric member, said carrier being connected to said concentric member by a pin in one thereof projecting into a substantially radial slot in the other, whereby they are held against relative rotation and said carrier is relatively reciprocated in the direction of the slot and relatively oscillated about said pin as a pivot.

31. In a machine of the character described, the combination, with a concentric and an eccentric member rotating at different velocities about the same axis, of a tool carrier journaled on said eccentric member, said carrier being connected to said concentric member by a pin in one thereof projecting into a substantially radial slot in the other, whereby they are held against relative rotation and said carrier is relatively reciprocated in the direction of the slot and relatively oscillated about said pin as a pivot, and a tool on said carrier mounted approximately 90° from said pin-and-slot connection.

32. In a machine of the character described, the combination, with a concentric and an eccentric member rotating a different velocities about the same axis, of a tool carrier journaled on said eccentric member, said carrier being connected to said concentric member by a pin in one thereof projecting into a substantially radial slot in the other, whereby they are held against relative rotation and said carrier is relatively reciprocated in the direction of the slot and relatively oscillated about said pin as a pivot, and a plurality of tools all mounted on the same side of said carrier and within an arc of 180° from said pin-and-slot connection.

In testimony of the foregoing, I have hereunto set my hand in the presence of two witnesses.

JULIUS BRENZINGER.

Witnesses:
 M. F. DICKEL,
 AARON GINSBURG.